(12) United States Patent
Park et al.

(10) Patent No.: US 12,428,356 B2
(45) Date of Patent: Sep. 30, 2025

(54) ORGANIC FERTILIZER MANUFACTURING SYSTEM

(71) Applicant: BSAC CO., INC., Gwangyang-si (KR)

(72) Inventors: Kwang Gi Park, Gwangyang-si (KR);
Hoi Jun Park, Gwangyang-si (KR)

(73) Assignee: BSAC CO., INC., Gwangyang-si (KR)

( * ) Notice: Subject to any disclaimer, the term of this patent is extended or adjusted under 35 U.S.C. 154(b) by 0 days.

(21) Appl. No.: 17/801,971

(22) PCT Filed: May 16, 2022

(86) PCT No.: PCT/KR2022/007000
§ 371 (c)(1),
(2) Date: Dec. 22, 2022

(87) PCT Pub. No.: WO2022/265233
PCT Pub. Date: Dec. 22, 2022

(65) Prior Publication Data
US 2024/0208881 A1 Jun. 27, 2024

(30) Foreign Application Priority Data
Jun. 14, 2021 (KR) .......................... 10-2021-0076823

(51) Int. Cl.
*B01J 2/06* (2006.01)
*C05G 5/30* (2020.01)
(Continued)

(52) U.S. Cl.
CPC ................ *C05G 5/30* (2020.02); *B01J 2/006* (2013.01); *B01J 2/12* (2013.01); *B29C 2791/002* (2013.01)

(58) Field of Classification Search
CPC .. C05G 3/0058; C05G 3/20; B01J 2/00; B01J 2/003; B01J 2/006; B01J 13/04;
(Continued)

(56) References Cited

U.S. PATENT DOCUMENTS 4,548,767 A * 10/1985 Hendricks ................ B01J 13/04
264/43
7,112,244 B2 * 9/2006 Takei .......................... B01J 2/16
118/DIG. 5
(Continued)

FOREIGN PATENT DOCUMENTS

KR 10-1997-0027022 A 6/1997
KR 10-2014-0003335 A 1/2014
(Continued)

OTHER PUBLICATIONS

Office Action issued Aug. 8, 2022 in Korean Application No. 10-2021-0076823.

*Primary Examiner* — Thu Khanh T. Nguyen
(74) *Attorney, Agent, or Firm* — Sughrue Mion, PLLC (57) ABSTRACT

An embodiment of the present invention provides an organic fertilizer manufacturing system, comprising: a fixed quantity ejector which feeds raw materials into a plurality of hoppers storing different raw materials; a crusher which crushes the raw materials fed from the hoppers; a mixer which mixes the raw materials crushed by the crusher; a steamer which provides moisture to the raw materials mixed by the mixer; a molder which molds the raw materials fed from the steamer into solid raw materials; a coater which coats microorganisms on the solid raw materials molded by the molder; a dryer which dries the solid raw materials fed from the coater to manufacture a fertilizer; and a packager which packages the fertilizer dried by the drier.

8 Claims, 9 Drawing Sheets

(51) Int. Cl.
*B01J 2/00* (2006.01)
*B01J 2/12* (2006.01)

(58) Field of Classification Search
CPC ... B01J 2/12; C05C 3/00; C05C 3/005; C05C 5/00; C05C 7/00
See application file for complete search history.

(56) References Cited

U.S. PATENT DOCUMENTS

2012/0234063 A1* 9/2012 Burnham ................ C05C 11/00
    71/12
2016/0355443 A1* 12/2016 Burnham ................. C05C 9/02

FOREIGN PATENT DOCUMENTS

KR     10-1631505 B1    6/2016
KR     10-2188357 B1    12/2020

* cited by examiner

ORGANIC FERTILIZER MANUFACTURING SYSTEM

CROSS REFERENCE TO RELATED APPLICATIONS

This application is a National Stage of International Application No. PCT/KR2022/007000 filed May 16, 2022, claiming priority based on Korean Patent Application No. 10-2021-0076823 filed Jun. 14, 2021.

TECHNICAL FIELD

The present invention relates to an organic fertilizer manufacturing system, and more specifically, to an organic fertilizer manufacturing system for manufacturing an organic fertilizer in the form of a pellet or granule.

BACKGROUND ART

Fertilizer refers to a generic term for nutrients which promote the growth of crops or vegetation by fertilizing fruit trees or forest soil, including fields, rice paddies, and soil. In general, fertilizers are defined as nutrients directly injected into soil or plants to promote the growth of crops or vegetation by maintaining or enhancing the productivity of the soil, or even if not directly injected, substances which indirectly help crop growth by improving the physicochemical properties of the soil, enhancing or inhibiting useful microorganisms, changing nutrients that exist in a form that cannot be directly used in plants into usable forms, or reducing the toxicity of substances toxic to the roots.

Higher plants absorb water and inorganic ingredients, which are nutrients, from their roots and use solar energy to synthesize various organic substances essential for growth by going through photosynthesis at their leaves. Native plants grow and die by absorbing nutrients in a predetermined area, and thus there is little loss of nutrients in the soil in the habitat, which allows native plants to grow relatively well. On the other hand, crops in farmland absorb nutrients from rhizosphere soil and have their harvest transported elsewhere once the growth is completed. Thus, the nutrients absorbed cannot be returned to the soil. Therefore, if the nutrients consumed while growing the crops are not artificially supplied in a timely manner, the productivity of crops may show a decreasing trend every year. Accordingly, in order to continuously maintain or increase the productivity of the land and maintain the productivity of crops, fertilization management is required according to the type of crops and the type of soil.

Accordingly, in order to increase the productivity of crops, chemical fertilizers (inorganic fertilizers) have been used. The use of an appropriate amount of chemical fertilizers may guarantee rapid growth of cultivated crops and increase in profits, but excessive fertilization may cause acidification of the cultivated soil and salt disturbance due to salt accumulation. Also, the soil ecosystem may be destroyed as the growth of microorganisms, the final decomposer, is inhibited, which may lead to degradation of the farmland.

In order to solve this problem, the use of organic fertilizers has been proposed instead of chemical fertilizers. Organic fertilizers are fermented with microorganisms and decomposed to provide nutrients for plants to use. When organic fertilizers are applied to the cultivated land, inorganic nutrients (N, P, K) and trace elements (Mg, Mn, Cu, B, Mo, etc.) are supplied as nutrients for cultivated crops to stimulate growth. In addition, amino acids, nucleic acids, organic acids, vitamins, etc. may be supplied allowing soil rhizosphere microorganisms to settle by providing physical pore voids in the soil. Accordingly, inorganic salts near the roots are ionized by organic acids secreted from the restored rhizosphere microorganisms to be easily absorbed in the crops, thereby reducing the accumulation of salts in the crop cultivation area.

However, when using livestock excrement, organic waste containing organic matter, or plant material, which are raw materials of the organic fertilizer, in their original form, there are problems in storage and difficulties in use, and thus organic fertilizers are generally used in the form of solidified organic fertilizers. On the other hand, when organic fertilizers are manufactured including microorganisms, in general, microorganisms may be included by being introduced to carriers such as rice straw, crushed wood, or natural minerals. However, when microorganisms are included in the form of a carrier, the fermentation speed of the organism may be reduced or it may be difficult to accomplish complete fermentation, thereby deteriorating the effect of soil reforming. The effect of promoting crop growth may deteriorate.

Accordingly, there have been many studies to develop an organic fertilizer which can provide improved quality and productivity of crops.

DETAILED DESCRIPTION OF INVENTION

Technical Task

It is a technical task of the present invention, which was to solve the above problem, to provide an organic fertilizer manufacturing system for manufacturing an organic fertilizer in the form of a pellet or granule.

Means for Solving Technical Task

An embodiment of the present invention, which aims at achieving the above technical task, provides an organic fertilizer manufacturing system, comprising: a fixed quantity ejector which feeds raw materials into a plurality of hoppers storing different raw materials; a crusher which crushes the raw materials fed from the hoppers; a mixer which mixes the raw materials crushed by the crusher; a steamer which provides moisture to the raw materials mixed by the mixer; a molder which molds the raw materials fed from the steamer into solid raw materials; a coater which coats microorganisms on the solid raw materials molded by the molder; a dryer which dries the solid raw materials fed from the coater to manufacture a fertilizer; and a packager which packages the fertilizer dried by the drier.

According to an embodiment of the present invention, the molder may comprise a first molding module part which molds solid raw materials in the form of a pellet having a cylindrical shape, wherein the first molding module part may comprise: an inner housing in which a raw material receiving part for receiving raw materials fed from the steamer is arranged; a molding mesh which is detachable from the inner housing and has a plurality of extrusion holes; a pressure part which is provided inside the inner housing and extrudes the raw materials introduced into the raw material receiving part in the outward direction of the molding mesh; an outer housing which has a feed hole connected to the steamer to feed the raw materials fed from the steamer into the raw material receiving part; and a cutting part which is coupled to the inside of the outer housing and cuts the solid raw materials extruded through the extrusion holes, wherein the inner housing and molding mesh may rotate in one direction.

According to an embodiment of the present invention, the first molding module part may further comprise a raw material guide part which is coupled to the lower portion of a frame supporting the pressure part and guides the raw materials fed through the feed hole into the raw material receiving part, wherein the raw material guide part may be inclined relative to the longitudinal direction of the inner housing.

According to an embodiment of the present invention, the molder may further comprise a second molding module part which molds the solid raw materials molded in a cylindrical shape by the first molding module part to be in the form of a granule having a circular shape, wherein the second molding module part may comprise: a first molding part which has a raw material inlet on the top thereof and has a first molding space therein: a second molding part which is connected to the first molding part and performs second molding operation on the solid raw materials that underwent first molding operation in the first molding part: a third molding part which is connected to the second molding part, performs third molding operation on the solid raw materials that underwent second molding operation in the second molding part and discharges the solid raw materials having a circular shape that underwent third molding operation to the outside: and a blast supply part which supplies wind in the direction from the first molding part to the third molding part, such that the solid raw materials molded in a predetermined shape move to the neighboring molding part.

According to an embodiment of the present invention, the first molding part may comprise: a first casing which constitutes the outward appearance and has the first molding space therein: a raw material inlet which is coupled to the upper portion of the first casing and guides introduction of solid raw materials into the first molding space: a first rotation disc which is provided in the lower portion inside the first casing and rotates and moves the solid raw materials introduced into the first molding space: and a first power supply part which supplies rotating power to the first rotation disc.

According to an embodiment of the present invention, a first casing provided in the first molding part and a second casing provided in the second molding part may communicate with each other via a first communication hole, and the second casing provided in the second molding part and a third casing provided in the third molding part may communicate with each other via a second communication hole, wherein the first communication hole and second communication hole may be aligned with each other, such that the molded solid raw materials may move to the neighboring molding part by the wind supplied from the blast supply part.

According to an embodiment of the present invention, the drier may comprise a first drying module part which dries solid raw materials molded by the first molding module part, wherein the first drying module part may comprise: a first drying storage part which contains solid raw materials fed from the coater; a first hot air supply part which is coupled to the upper portion of the first drying storage part and supplies hot air into the first drying storage part; and an opening and closing control part which selectively opens or closes a through hole on the bottom of the first drying storage part and guides a fertilizer dried in the first drying storage part to the packager.

According to an embodiment of the present invention, the drier may further comprise a second drying module part which dries solid raw materials molded by the second molding module part and a blast drying part, wherein the second drying module part may comprise: a second drying storage part which has an inlet into which solid raw materials passing through the coater are introduced at one end and has an outlet from which dried solid raw materials are discharged at the other end; a mixed blade part which protrudes from the inside of the second drying storage part and is arranged at predetermined intervals along the circumferential direction and longitudinal direction of the second drying storage part; and a second hot air supply part which supplies hot air into the second drying storage part, wherein the mixed blade part may mix the solid raw materials while the second drying storage part rotates, and the solid raw materials dried in the second drying module part may move to the blast drying part.

According to an embodiment of the present invention, the second drying storage part may be inclined such that the inlet is arranged higher than the outlet with respect to a virtual horizontal line.

Effect of Invention

The effects of the organic fertilizer manufacturing system according to the present invention as described above are as follows.

According to the present invention, the organic fertilizer manufacturing system manufactures an organic fertilizer in the form of a pellet or granule coated with microorganisms through an automated process.

The effects of the present invention are not limited to the above-mentioned effects, and it should be understood that the effects of the present invention include all effects that could be inferred from the configuration of the invention described in the detailed description of the invention or the appended claims.

BEST MODE FOR CARRYING OUT THE INVENTION

Hereinafter, the present invention will be explained with reference to the accompanying drawings. The present invention, however, may be modified in different ways, and should not be construed as limited to the embodiments set forth herein. Also, in order to clearly explain the present invention in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

According to the present invention, an upper portion and a lower portion of a target member mean being placed on the top or bottom of the target member, which does not necessarily mean being placed above or below with respect to the direction of gravity.

Hereinafter, the embodiments of the present invention are described in detail with reference to the accompanying drawings.

Figure 1:
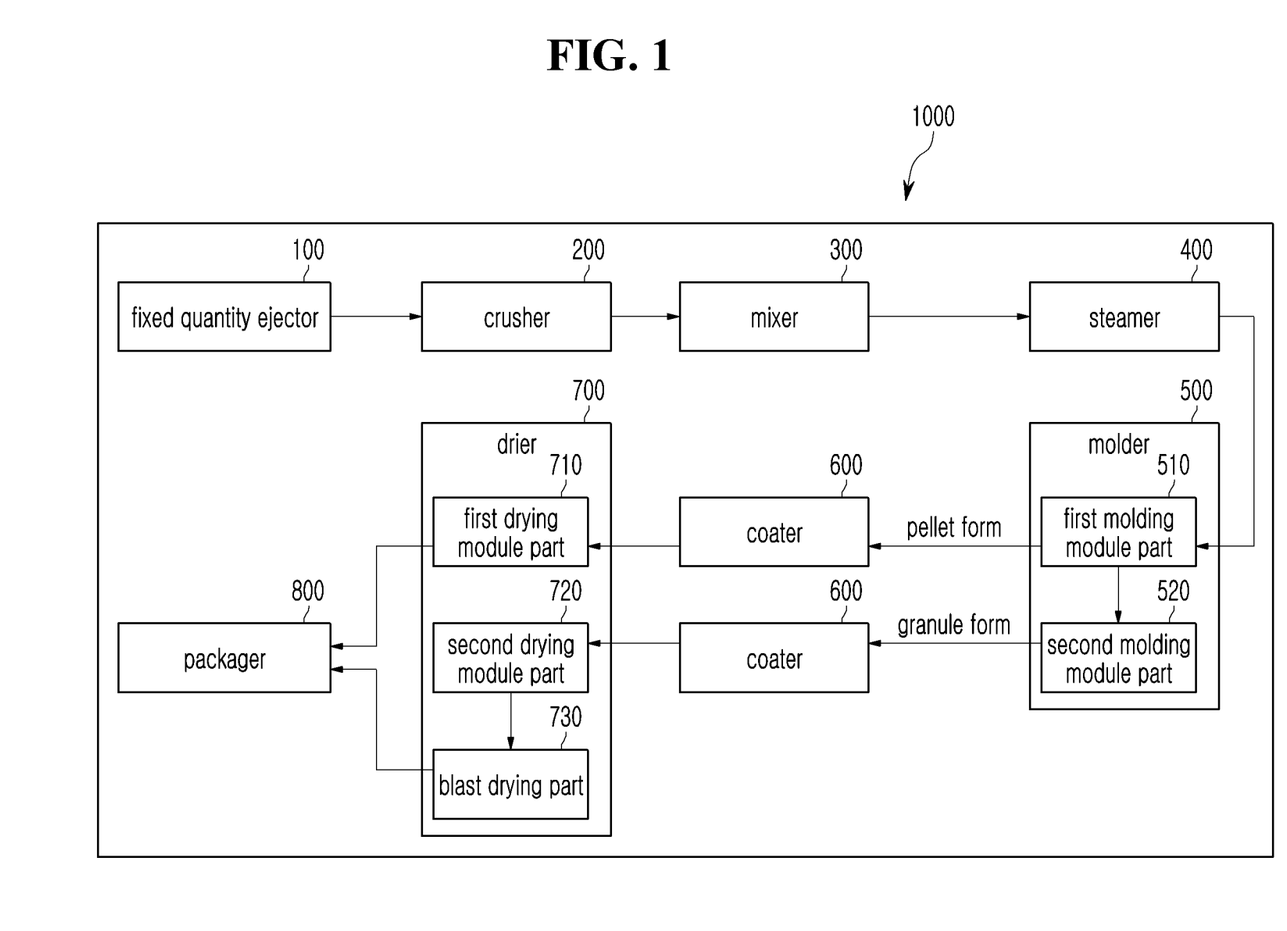
FIG. 1 is a schematic block diagram of the organic fertilizer manufacturing system according to an embodiment of the present invention.
Figure 2:
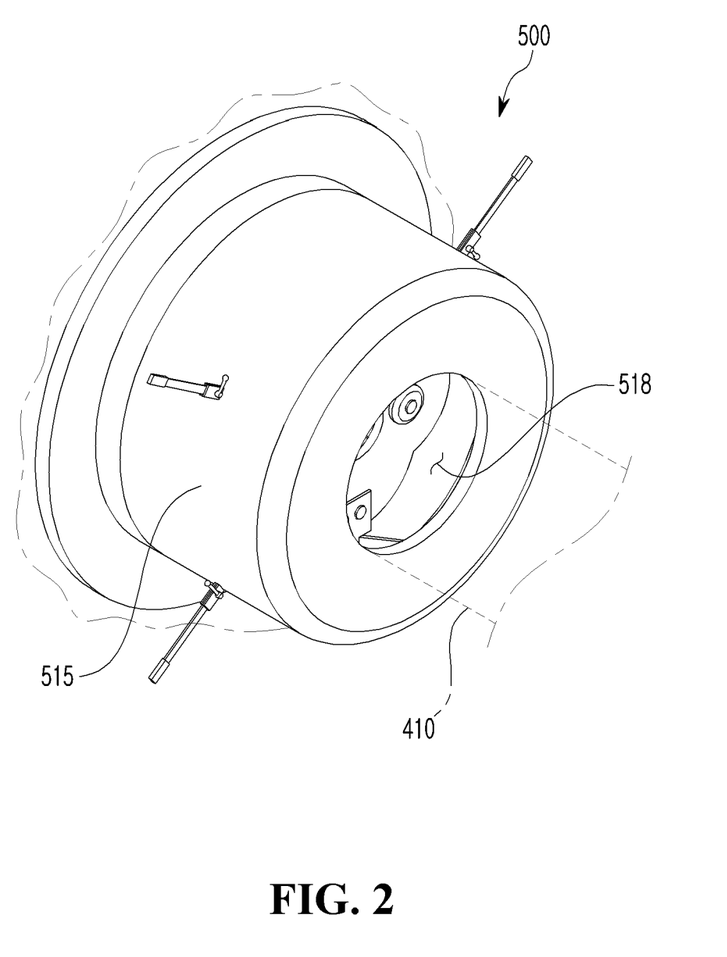
FIG. 2 is an exemplary view of the first molding module part with the outer housing closed according to an embodiment of the present invention.
Figure 3:
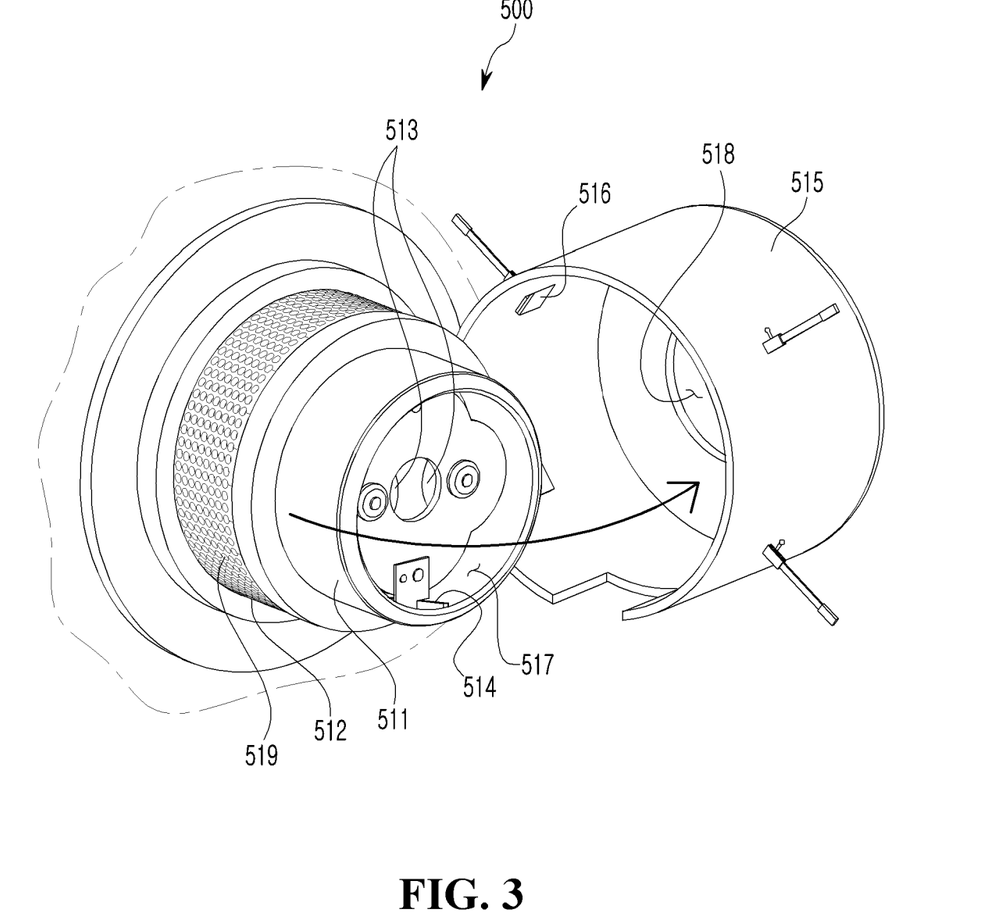
FIG. 3 is an exemplary view of the first molding module part with the outer housing open according to an embodiment of the present invention.
Figure 4:
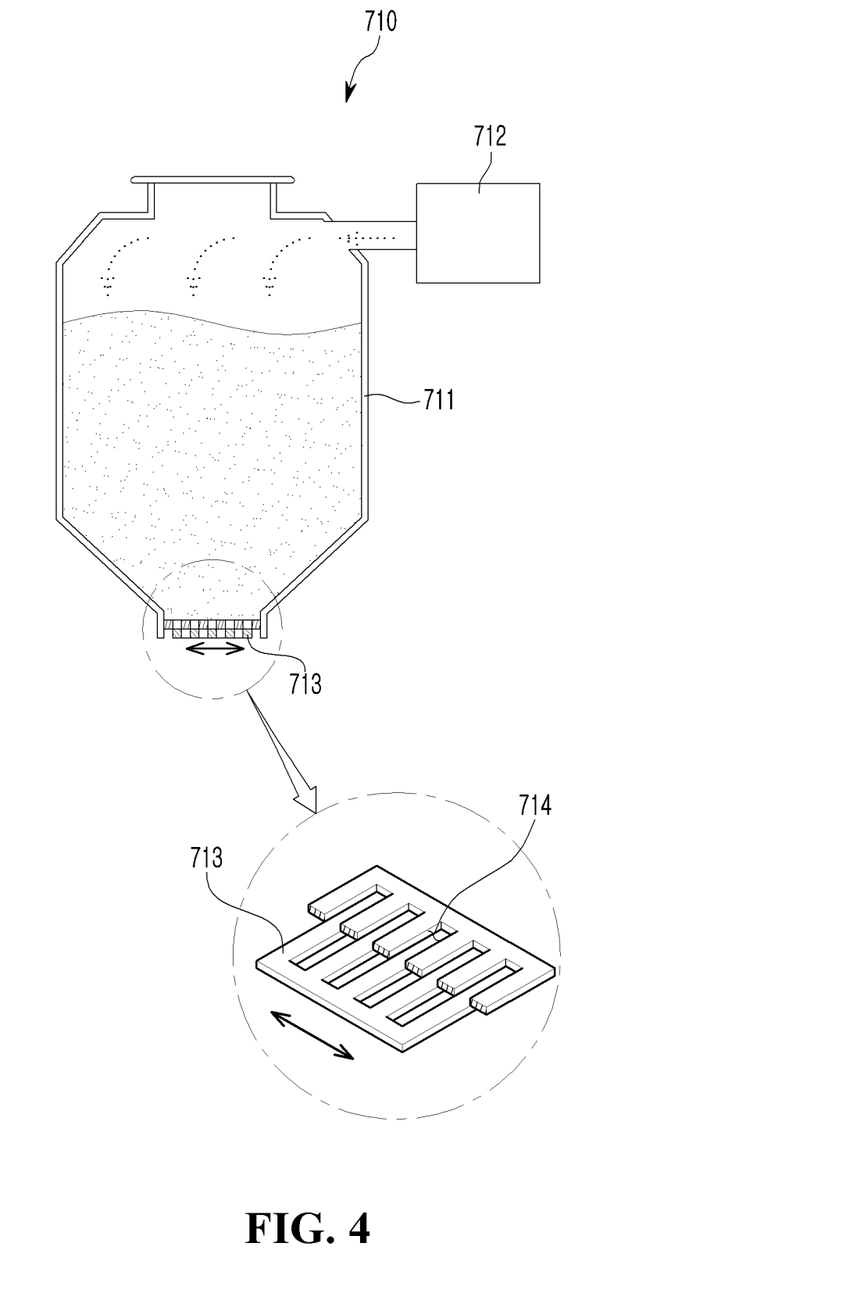
FIG. 4 is an exemplary view of the first drying module part according to an embodiment of the present invention.

FIG. 1 is a schematic block diagram of the organic fertilizer manufacturing system according to an embodiment of the present invention; FIG. 2 is an exemplary view of the first molding module part with the outer housing closed according to an embodiment of the present invention; FIG. 3 is an exemplary view of the first molding module part with the outer housing open according to an embodiment of the present invention; and FIG. 4 is an exemplary view of the first drying module part according to an embodiment of the present invention.

As shown in FIG. 1 to FIG. 4, the organic fertilizer manufacturing system 1000 may comprise a fixed quantity ejector 100, a crusher 200, a mixer 300, a steamer 400, a molder 500, a coater 600, a drier 700 and a packager 800.

The fixed quantity ejector 100 feeds raw materials into respective hoppers storing different raw materials. For example, for four hoppers, first hopper to fourth hopper, raw materials contained in the first hopper to the fourth hopper respectively may be different from each other.

As to the first hopper to the fourth hopper containing different raw materials, the ratio of raw materials introduced may vary depending on the type of fertilizer that is finally manufactured. In other words, finally manufactured fertilizers may have different mixing ratios of raw materials.

For example, when finally manufactured fertilizer products are classified into gold products, plus products, alpha products and export products, the ratio of raw materials introduced from the first hopper to the fourth hopper may vary in a process of manufacturing each product.

The fixed quantity ejector 100 for feeding raw materials into respective hoppers selectively feeds necessary raw materials with a raw material monitoring part (not shown) for monitoring the state of raw materials in the respective hoppers in real time.

For example, the fixed quantity ejector 100 may be provided in a raw material storage in which a variety of raw materials is stored, and the first hopper to the fourth hopper may be provided in a mixing storage which is another place different from the raw material storage. In other words, the fixed quantity ejector 100 and the hoppers may be disposed in different places, and raw materials fed from the fixed quantity ejector 100 may be fed into the respective hoppers via various transport means, for example, bucket elevator, conveyor, etc.

A user may confirm the amounts of raw materials contained in the first hopper to the fourth hopper with the raw material monitoring part provided in the raw material storage. When, for example, the raw materials contained in the first hopper are in a predetermined amount or less, the user may feed the corresponding raw materials into the first hopper by introducing the raw materials to be fed into the first hopper using the fixed quantity ejector 100.

For the fixed quantity ejector 100, a single fixed quantity ejector 100 may feed raw materials into a plurality of hoppers, or separate fixed quantity ejectors 100 may be provided for respective hoppers. In addition, the fixed quantity ejector 100 and hoppers may be disposed together in one storage, without being placed in different storages (different places).

The crusher 200 crushes the raw materials fed from each hopper. In other words, the crusher 200 crushes, for example, raw materials in the agglomerated state into powders, so that the raw materials introduced from each hopper are effectively mixed in the mixer 300. The crusher 200 crushes the particles of raw materials in a uniform size.

The mixer 300 mixes the raw materials crushed in the crusher 200. The mixer 300 effectively mixes a plurality of raw materials using various mixing means such as an impeller.

The raw materials mixed in the mixer 300 are fed into the steamer 400.

The steamer 400 provides moisture to the mixed raw materials. The amount of moisture to be provided by the steamer 400 may vary depending on finally manufactured fertilizer products.

For example, when the finally manufactured fertilizer is in the form of a pellet having a cylindrical shape, the steamer 400 provides moisture such that the moisture content of the mixed raw materials is 16 to 18%. When the finally manufactured fertilizer is in the form of a granule having a circular shape, the steamer 400 provides moisture such that the moisture content of the mixed raw materials is 20 to 24%. The amount of steam provided by the steamer 400 does not necessarily need to satisfy the aforementioned moisture content of raw materials, but may be adjusted differently.

The steamer 400 provides more moisture to a fertilizer manufactured in the form of a granule than to a fertilizer manufactured in the form of a pellet. This is because the fertilizer in the form of a granule is manufactured by being molded in a cylindrical shape in a first molding module part 510, and then molded in a circular shape in a second molding module part 520, and during this process, more moisture allows prevention of cracking of solid raw materials and also effective shape change to a circular shape.

The molder 500 molds the raw materials fed from the steamer 400 to have a predetermined fertilizer shape.

The molder 500 may comprise a first molding module part 510.

The first molding module part 510 molds the raw materials fed from the steamer 400 into a pellet having a cylindrical shape.

The first molding module part 510 may comprise an inner housing 511, a molding mesh 512, a pressure part 513, a raw material guide part 514, an outer housing 515 and a cutting part 516.

In the inner housing 511, a raw material receiving part 517 for receiving the raw materials fed from the steamer 400 is arranged.

The outer housing 515 is coupled to the inner housing 511 and arranged outside the inner housing 511. The inner diameter of the outer housing 515 is greater than the outer diameter of the inner housing 511.

In the outer housing 515, a feed hole 518 connected to a raw material moving pipe 410, through which the raw materials provided with steam by the steamer 400 moves, is arranged, such that the raw materials fed from the steamer 400 may be guided into the raw material receiving part 517 through the feed hole 518.

The molding mesh 512 is detachable from the inner housing 511. A user may select and change the molding mesh 512 according to, for example, the finally manufactured product.

In the molding mesh 512, a plurality of extrusion holes 519 is arranged. While the inner housing 511 rotates, the raw materials contained in the raw material receiving part 517 are pressed in the outward direction of the molding mesh 512 by the pressure part 513. The raw material passing through the extrusion holes 519 is extrusion-molded in a cylindrical shape by the pressure part 513.

The pressure part 513 is placed inside the inner housing 511. The pressure part 513 has, for example, a roller shape, to extrude the raw materials introduced between the molding mesh 512 and pressure part 513.

The raw material guide part 514 is coupled to the lower portion of the frame supporting the pressure part 513. The raw material guide part 514 guides the raw materials fed through the feed hole 518 to the raw material receiving part 517.

The raw material guide part 514 is inclined relative to the longitudinal direction of the inner housing 511, to effectively feed the raw materials introduced through the feed hole 518 while the inner housing 511 rotates to the raw material receiving part 517.

The cutting part 516 is coupled to the inside of the outer housing 515, and arranged at predetermined intervals along the circumference of the outer housing 515.

The cutting part 516 cuts the solid raw materials having a cylindrical shape extruded to the outside through the extrusion holes 519 while the inner housing 511 and molding mesh 512 rotate in one direction. Accordingly, the extruded solid raw materials may be manufactured in the form of a pellet having a cylindrical shape.

For the solid raw materials manufactured in the form of a pellet, different manufacturing processes are applied depending on whether the finally manufactured fertilizer is in the form of a pellet or granule.

An embodiment of the present invention describes an example of a fertilizer manufactured in the form of a pellet.

The solid raw materials manufactured in the form of a pellet in the first molding module part 510 are transferred to the coater 600.

The coater 600 applies liquid microorganisms to the outer surface of the solid raw materials. The coater 600 may coat microorganisms on the outer surface of the solid raw materials by, for example, spraying microorganisms. The coater 600 may control spraying conditions such as spraying rate, spraying amount, spraying force, etc., according to need. By selectively controlling the spraying conditions, the coater 600 may adjust the coating amount on the surface of the organic fertilizer and the thickness of the coating layer. The content of microorganisms coated on the organic fertilizer may be selectively adjusted.

By adjusting the content of microorganisms as above, the degree of fermentation of the organic fertilizer may be differentiated, and nutrients of the organic fertilizer may be designed in various ways. Particularly, NPK, a significant factor for fertilizers, may be adjusted in various ways, which leads to a fertilizer with optimal NPK for each crop.

The coater 600 may spray liquid microorganisms onto the solid raw materials, as described above, or may coat microorganisms on the outer surface of the solid raw materials by impregnating the solid raw materials in a container containing microorganisms.

The coater 600 is not limited to a specific configuration, but may have any configurations as long as it can coat microorganisms evenly with no lumps on the outer surface of the solid raw materials.

The dryer 700 dries the solid raw material coated with microorganisms. The solid raw materials that underwent drying may be manufactured as the final fertilizer. The solid raw materials manufactured in the form of a pellet through the first molding module part 510 may be manufactured as the final fertilizer in a first drying module part 710.

The first drying module part 710 may comprise a first drying storage part 711, a first hot air supply part 712 and an opening and closing control part 713.

The first drying storage part 711 contains the solid raw materials that underwent coating with microorganisms in the coater 600. The solid raw materials that underwent coating with microorganisms in the coater 600 is fed from the upper portion of the first drying storage part 711.

The solid raw materials contained in the first drying storage part 711 are dried by the first hot air supply part 712. The first hot air supply part 712 is coupled to one side of the upper portion of the first drying storage part 711 and supplies hot air into the first drying storage part 711.

The solid raw materials fed from the upper portion of the first drying storage part 711 are dried while moving to the lower portion of the first drying storage part 711, and the dried solid raw materials are discharged to the lower portion of the first drying storage part 711.

The opening and closing control part 713 selectively opens or closes a through hole 714 on the bottom of the first drying storage part 711.

The opening and closing control part 713 selectively opens or closes the through hole 714, to guide the fertilizer that is completely dried over a certain amount of time to the packager 800.

The first drying module part 710 is not limited to the above structure, but may have any structures as long as it can effectively dry solid raw materials.

The packager 800 packages the fertilizer dried in the first drying storage part 711. The packager 800 performs automatic packaging in the state where the fertilizer is contained in a pre-prepared packaging container (not shown).

Figure 5:
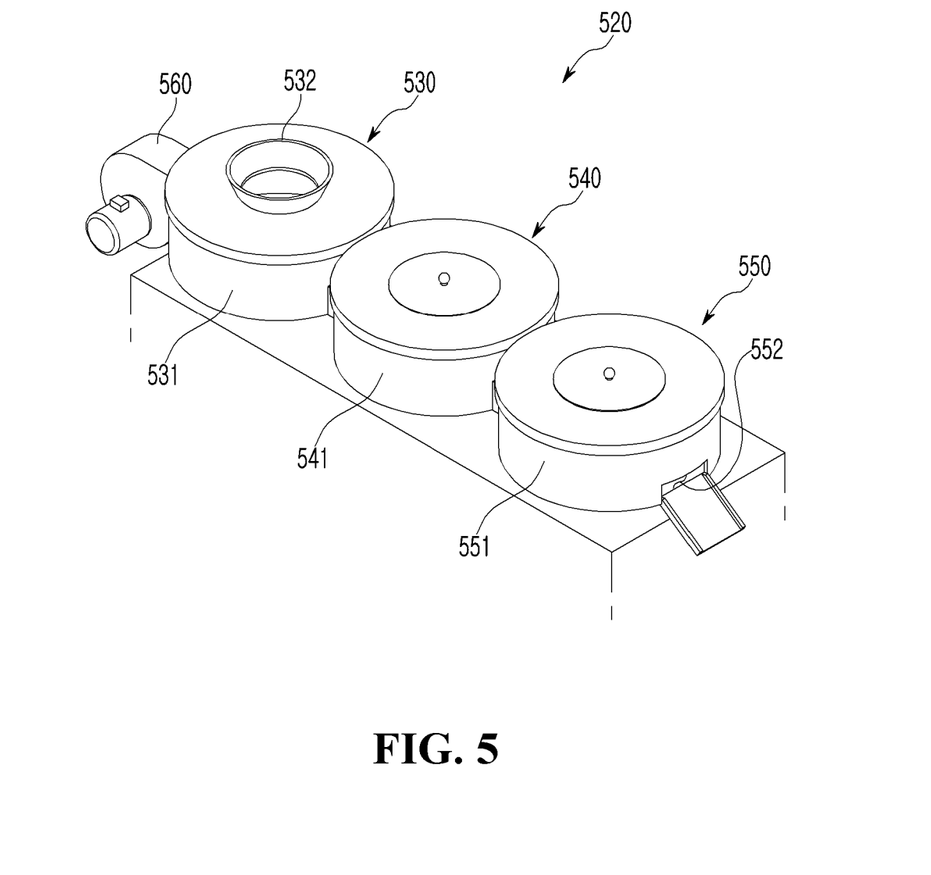
FIG. 5 is a perspective view of the second molding module part according to another embodiment of the present invention.
Figure 6:
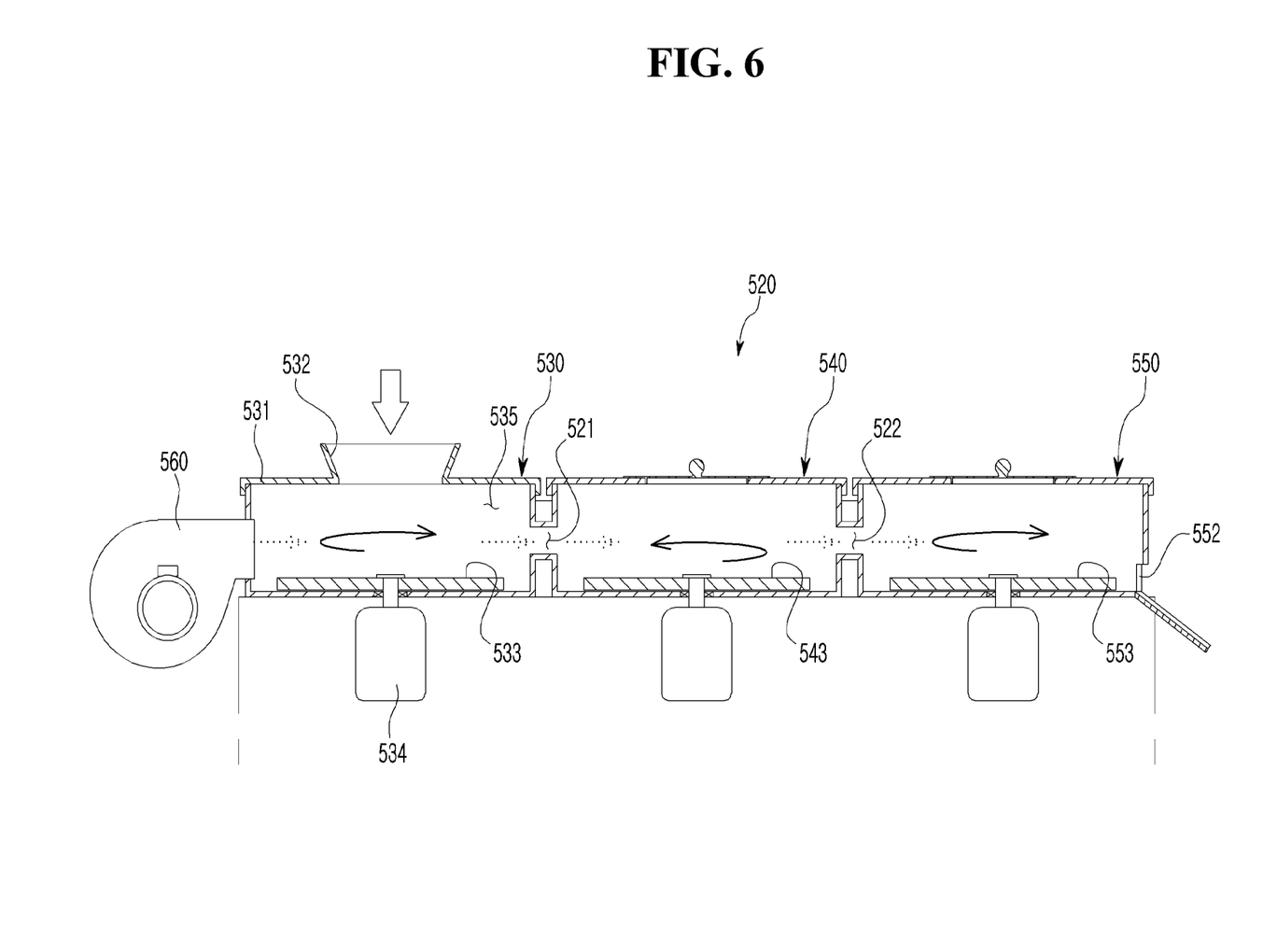
FIG. 6 is an exemplary view of the second molding module part according to another embodiment of the present invention.
Figure 7:
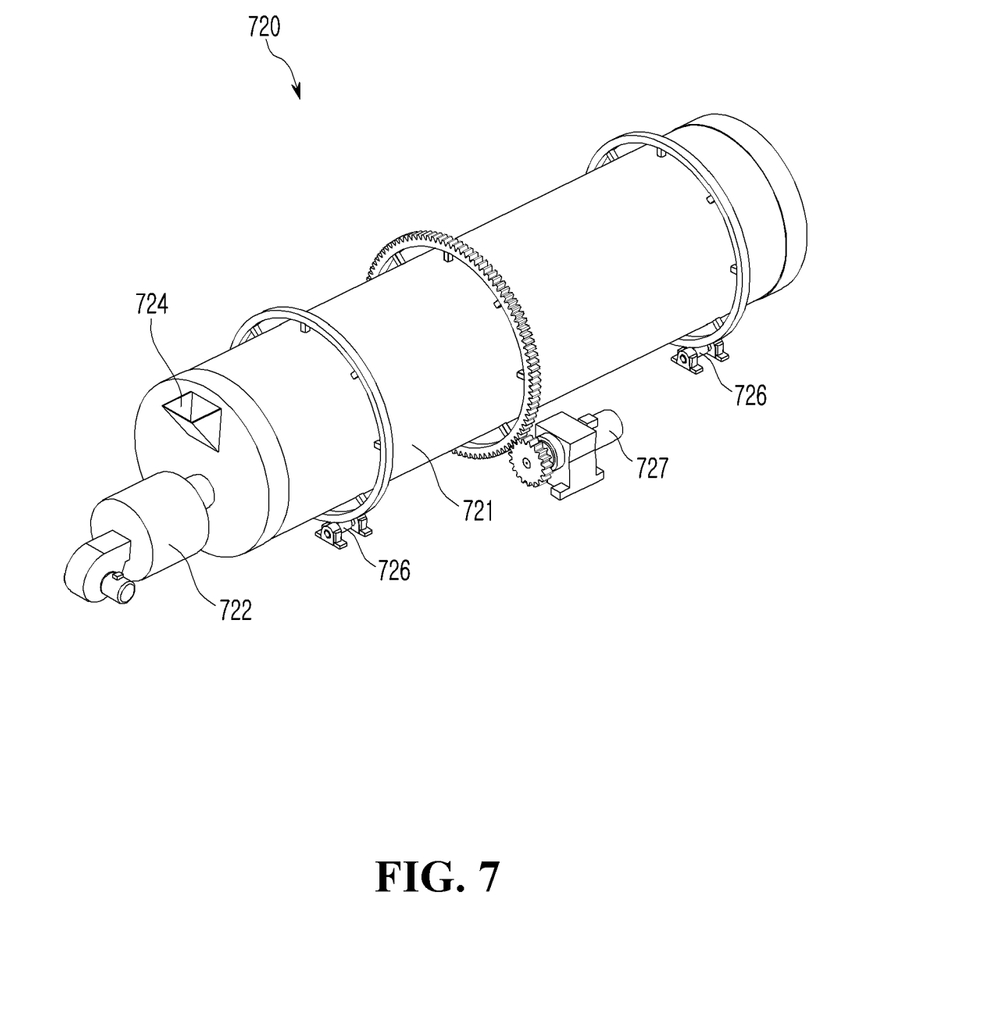
FIG. 7 is a perspective view of the second drying module part according to another embodiment of the present invention.
Figure 8:
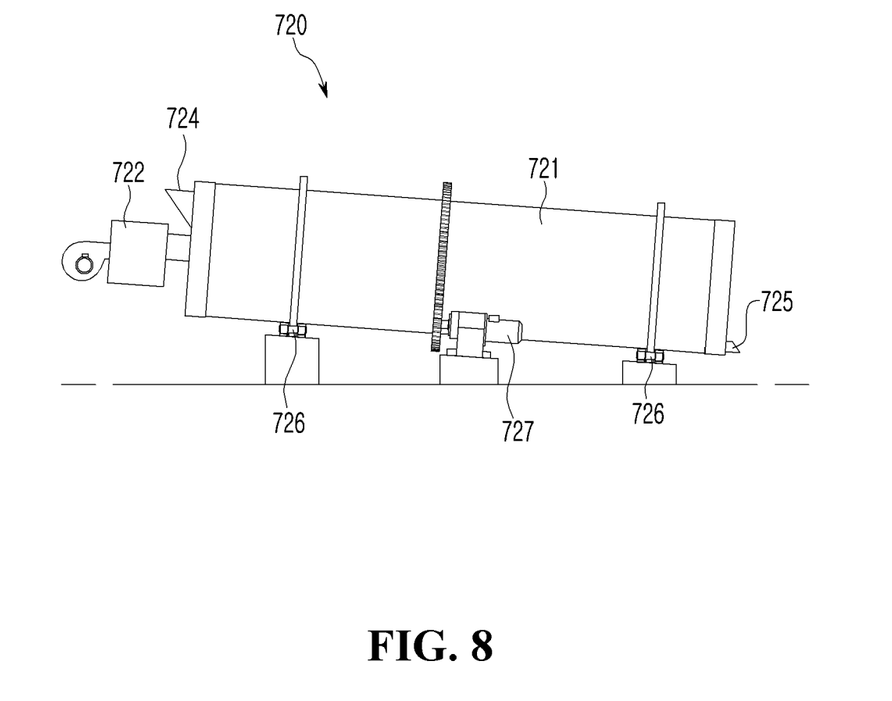
FIG. 8 is a side view of the second drying module part according to another embodiment of the present invention.
Figure 9:
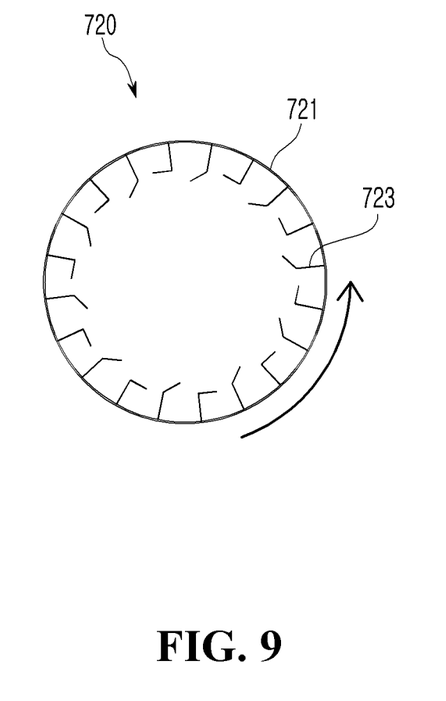
FIG. 9 is a cross-sectional exemplary view of the second drying module part according to another embodiment of the present invention.

FIG. 5 is a perspective view of the second molding module part according to another embodiment of the present invention; FIG. 6 is an exemplary view of the second molding module part according to another embodiment of the present invention; FIG. 7 is a perspective view of the second drying module part according to another embodiment of the present invention; FIG. 8 is a side view of the second drying module part according to another embodiment of the present invention; and FIG. 9 is a cross-sectional exemplary view of the second drying module part according to another embodiment of the present invention.

FIG. 5 to FIG. 9 relate to another embodiment of the present invention, illustrating the organic fertilizer manufacturing system 1000 that manufactures a fertilizer in the form of a granule.

The second molding module part 520 molds, into a granule form having a circular shape, the solid raw materials molded in the form of a pellet having a cylindrical shape through the first molding module part 510.

The second molding module part 520 may comprise a first molding part 530, a second molding part 540, a third molding part 550 and a blast supply part 560.

The first molding part 530, second molding part 540 and third molding part 550 are connected to each other. The first molding part 530 feeds, to the second molding part 540, the solid raw materials that underwent first molding operation in a predetermined shape. The second molding part 540 performs second molding operation on the solid raw materials fed from the first molding part 530 in a predetermined shape and feeds the raw material into the third molding part 550. The third molding part 550 molds the solid raw materials fed from the second molding part 540 in the form of a granule having a circular shape and discharges the raw materials to the outside through a raw material outlet 552.

A first casing 531 provided in the first molding part 530 communicates with a second casing 541 provided in the second molding part 540 via a first communication hole 521. The second casing 541 provided in the second molding part 540 communicates with a third casing 551 provided in the third molding part 550 via a second communication hole 522.

The first communication hole 521 and second communication hole 522 are aligned with each other. In other words, the first communication hole 521 and second communication hole 522 are arranged in a virtual straight line.

The blast supply part 560 is aligned with the first communication hole 521 and second communication hole 522. The blast supply part 560 supplies wind in the direction from the first molding part 530 to the third molding part 550, and the wind supplied from the blast supply part 560 passes through the first communication hole 521 and is discharged into the second communication hole 522.

The blast supply part 560 allows the solid raw materials moved to the upper portions of the molding parts, which have a small size while being molded in each molding part, to be arranged next to each other and transferred to the next molding part. In other words, the blast supply part 560 guides movement of the solid raw materials using the wind.

With regard to the first molding part 530 among the plurality of molding parts, the first molding part 530 may comprise a first casing 531, a raw material inlet 532, a first rotation disc 533 and a first power supply part 534.

The first casing 531 constitutes the outward appearance of the first molding part 530. A first molding space 535 for containing solid raw materials is arranged inside the first casing 531.

The raw material inlet 532 is coupled to the upper portion of the first casting 531, and guides supply of the solid raw materials into the first molding space 535.

The first rotation disc 533 is arranged in the lower portion inside the first casing 531. The first rotation disc 533 receives power from the first power supply part 534 and rotates.

The first rotation disc 533 rotates the solid raw materials contained in the first molding space 535. During this process, the solid raw materials having a cylindrical shape may be molded into solid raw materials having a circular shape by friction, etc., between the solid raw materials contained in the first casing 531.

In other words, solid raw materials having a cylindrical shape may be molded into solid raw materials having a circular shape while passing through the first molding part 530, second molding part 540 and third molding part 550.

The second molding part 540 and third molding part 550 perform the same operation as the first molding part 530 on solid raw materials.

The first rotation disc 533 provided in the first molding part 530 and the second rotation disc 543 provided in the second molding part 540 may rotate in different directions. If the first rotation disc 533 rotates in the clockwise direction, the second rotation disc 543 may rotate in the counterclockwise direction. In addition, the third rotation disc 553 provided in the third molding part 550 and the second rotation disc 543 provided in the second molding part 540 may rotate in different directions.

The solid raw materials having a circular shape passing through the first molding part 530 and second molding part 540 and being discharged from the third molding part 550 are transferred to the coater 600. The coater 600 coats microorganisms on the outer surface of the solid raw materials.

The dryer 700 dries the solid raw materials coated with microorganisms.

The solid raw materials manufactured in the form of a granule having a circular shape through the second molding module part 520 may be manufactured as the final fertilizer through a second drying module part 720 and a blast drying part 730.

The second drying module part 720 may comprise a second drying storage 721, a second hot air supply part 722 and a mixed blade part 723.

The second drying storage part 721 constitutes the outward appearance of the second drying module part 720.

An inlet 724 into which solid raw materials are introduced is arranged at one end of the second drying storage part 721, and an outlet 725 from which dried solid raw materials are discharged is arranged at the other end of the second drying storage part 721.

The second drying storage part 721 has a predetermined length, and the second drying storage part 721 is inclined relative to the longitudinal direction of the second drying storage part 721. The inlet 724 of the second drying storage part 721 is arranged higher than the outlet 725 of the second drying storage part 721 with respect to a virtual horizontal line. Accordingly, the solid raw materials introduced into the inlet 724 may move to the outlet 725 along the inclined surface of the second drying storage part 721.

The second hot hair supply part 722 supplies hot air into the second drying storage part 721. Accordingly, the solid raw materials moving inside the second drying storage part 721 may be dried by the second hot air supply part 722.

The second drying storage part 721 is rotatable by a rotation roller 726 supporting and rotating the second drying storage part 721 and a rotating power driving part 727 supplying rotating power to the second drying storage part 721. The rotation of the second drying storage part 721 may effectively dry the solid raw materials contained in the second drying storage part 721.

The mixed blade part 723 is arranged inside the second drying storage part 721 to dry solid raw materials more effectively.

The mixed blade part 723 protrudes at predetermined intervals along the circumferential direction of the second drying storage part 721, and also protrudes at predetermined intervals along the longitudinal direction of the second drying storage part 721.

The mixed blade part 723 mixes solid raw materials contained in the second drying storage part 721 and also effectively supplies hot air between the solid raw materials, while the second drying storage part 721 rotates. Accordingly, the drying efficiency of the solid raw materials may increase.

The solid raw materials that underwent drying in the second drying storage module part 720 are transferred to the blast drying part 730. The blast drying part 730 performs additional blast drying on the solid raw materials. The blast drying part 730 may provide, for example, wind at room temperature to the solid raw materials.

The solid raw materials that are completely dried, i.e., fertilizer, are transferred to the packager 800 for packaging.

The organic fertilizer manufacturing system 1000 manufactures an organic fertilizer in the form of a pellet or granule coated with microorganisms through an automated process.

However, the above embodiment is a preferred embodiment of the present invention, and the scope of the present invention is not limited to the embodiment.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

What is claimed is:

1. An organic fertilizer manufacturing system, the system comprising:
   a fixed quantity ejector which feeds raw materials into a plurality of hoppers storing different raw materials;
   a crusher which crushes the raw materials fed from the hoppers;
   a mixer which mixes the raw materials crushed by the crusher;
   a steamer which provides moisture to the raw materials mixed by the mixer;
   a molder which molds the raw materials fed from the steamer into solid raw materials;
   a coater which coats microorganisms on the solid raw materials molded by the molder;
   a dryer which dries the solid raw materials fed from the coater to manufacture a fertilizer; and
   a packager which packages the fertilizer dried by the drier,
   wherein the molder comprises a first molding module part which molds solid raw materials to be in the form of a pellet having a cylindrical shape, wherein the first molding module part comprises:
   an inner housing in which a raw material receiving part for receiving raw materials fed from the steamer is arranged;
   a molding mesh which is detachable from the inner housing and has a plurality of extrusion holes;
   a pressure part which is provided inside the inner housing and extrudes the raw materials introduced into the raw material receiving part in the outward direction of the molding mesh;
   an outer housing which has a feed hole connected to the steamer to feed the raw materials fed from the steamer into the raw material receiving part; and
   a cutting part which is coupled to the inside of the outer housing and cuts the solid raw materials extruded through the extrusion holes,
   wherein the inner housing and molding mesh rotate in one direction, and the pressure part extrudes the raw material in the outward direction of the molding mesh by centrifugal force applied by the rotation of the inner housing.

2. The organic fertilizer manufacturing system of claim 1, wherein the first molding module part further comprises a raw material guide part which is coupled to the lower portion of a frame supporting the pressure part and guides the raw materials fed through the feed hole into the raw material receiving part,
   wherein the raw material guide part is inclined relative to the longitudinal direction of the inner housing.

3. The organic fertilizer manufacturing system of claim 1, wherein the molder further comprises a second molding module part which molds the solid raw materials molded in a cylindrical shape by the first molding module part to be in the form of a granule having a circular shape,
   wherein the second molding module part comprises:
   a first molding part which has a raw material inlet on the top thereof and has a first molding space therein;
   a second molding part which is connected to the first molding part and performs second molding operation on the solid raw materials that underwent first molding operation in the first molding part;
   a third molding part which is connected to the second molding part, performs third molding operation on the solid raw materials that underwent second molding operation in the second molding part, and discharges the solid raw materials having a circular shape that underwent third molding operation to the outside; and
   a blast supply part which supplies wind in the direction from the first molding part to the third molding part, such that the solid raw materials molded in a predetermined shape move to the neighboring molding part.

4. The organic fertilizer manufacturing system of claim 3, wherein the first molding part comprises:
   a first casing which constitutes the outward appearance and has the first molding space therein;
   a raw material inlet which is coupled to the upper portion of the first casing and guides introduction of solid raw materials into the first molding space;
   a first rotation disc which is provided in the lower portion inside the first casing and rotates and moves the solid raw materials introduced into the first molding space; and
   a first power supply part which supplies rotating power to the first rotation disc.

5. The organic fertilizer manufacturing system of claim 3, wherein a first casing provided in the first molding part and a second casing provided in the second molding part communicate with each other via a first communication hole, and the second casing provided in the second molding part and a third casing provided in the third molding part communicate with each other via a second communication hole,
   wherein the first communication hole and second communication hole are aligned with each other, such that the molded solid raw materials move to the neighboring molding part by the wind supplied from the blast supply part.

6. The organic fertilizer manufacturing system of claim 1, wherein the drier comprises a first drying module part which dries solid raw materials molded by the first molding module part, wherein the first drying module part comprises:
- a first drying storage part which contains solid raw materials fed from the coater;
- a first hot air supply part which is coupled to the upper portion of the first drying storage part and supplies hot air into the first drying storage part; and
- an opening and closing control part which selectively opens or closes a through hole on the bottom of the first drying storage part and guides a fertilizer dried in the first drying storage part to the packager.

7. The organic fertilizer manufacturing system of claim 3, wherein the drier further comprises a second drying module part which dries solid raw materials molded by the second molding module part and a blast drying part, wherein the second drying module part comprises:
- a second drying storage part which has an inlet into which solid raw materials passing through the coater are introduced at one end and has an outlet from which dried solid raw materials are discharged at the other end;
- a mixed blade part which protrudes from the inside of the second drying storage part and is arranged at predetermined intervals along the circumferential direction and longitudinal direction of the second drying storage part; and
- a second hot air supply part which supplies hot air into the second drying storage part,
- wherein the mixed blade part mixes the solid raw materials while the second drying storage part rotates, and the solid raw materials dried in the second drying module part move to the blast drying part.

8. The organic fertilizer manufacturing system of claim 7, wherein the second drying storage part is inclined such that the inlet is arranged higher than the outlet with respect to a virtual horizontal line.

\* \* \* \* \*